vv(12) United States Patent
Dhillon et al.

(10) Patent No.: US 11,586,632 B2
(45) Date of Patent: Feb. 21, 2023

(54) DYNAMIC TRANSACTION COALESCING

(71) Applicant: Netflix, Inc., Los Gatos, CA (US)

(72) Inventors: Sargun Dhillon, San Francisco, CA (US); Fabio Correia Kung, San Jose, CA (US)

(73) Assignee: Netflix, Inc., Los Gatos, CA (US)

( * ) Notice: Subject to any disclaimer, the term of this patent is extended or adjusted under 35 U.S.C. 154(b) by 208 days.

(21) Appl. No.: 16/918,488

(22) Filed: Jul. 1, 2020

(65) Prior Publication Data

US 2021/0004375 A1 Jan. 7, 2021

Related U.S. Application Data

(60) Provisional application No. 62/870,627, filed on Jul. 3, 2019.

(51) Int. Cl.
*G06F 16/00* (2019.01)
*G06F 16/2455* (2019.01)

(52) U.S. Cl.
CPC .............. *G06F 16/24565* (2019.01)

(58) Field of Classification Search
CPC .............. G06F 16/24565; G06F 16/90335
See application file for complete search history.

(56) References Cited

U.S. PATENT DOCUMENTS

| 2005/0207439 | A1* | 9/2005 | Iyengar | H04L 67/61 370/428 |
| 2006/0190430 | A1* | 8/2006 | Luo | G06F 16/217 |
| 2009/0077011 | A1* | 3/2009 | Natarajan | G06F 16/24532 |
| 2009/0157666 | A1* | 6/2009 | Gehrke | G06F 16/951 707/999.005 |
| 2010/0094828 | A1* | 4/2010 | Mehta | G06F 9/5027 718/103 |
| 2011/0219031 | A1* | 9/2011 | Chi | G06F 16/00 707/E17.012 |
| 2012/0023501 | A1* | 1/2012 | Chi | G06Q 50/10 718/103 |
| 2012/0144234 | A1* | 6/2012 | Clark | G06F 11/0727 714/16 |
| 2014/0379712 | A1* | 12/2014 | Lafuente Alvarez | G06F 16/24568 707/736 |

(Continued)

*Primary Examiner* — Syed H Hasan
(74) *Attorney, Agent, or Firm* — Greenberg Traurig, LLP

(57) ABSTRACT

The disclosed computer-implemented method includes establishing a coalescing service configured to combine queries received at the coalescing service. The method further includes instantiating, within the coalescing service, multiple execution windows to which the received queries are to be assigned, where each execution window has an assigned deadline within which to execute. The method also includes analyzing a first query among the received queries to identify characteristics of the first query. The method then includes assigning the first query to a first execution window among the execution windows according to the identified characteristics. Then, upon detecting the occurrence of a specified trigger for at least one of the queries in the first execution window, the method includes executing those queries, including the first query, that are assigned to the first execution window. Various other methods, systems, and computer-readable media are also disclosed.

20 Claims, 9 Drawing Sheets

(56) References Cited

U.S. PATENT DOCUMENTS

| | | | |
|---|---|---|---|
| 2015/0169684 A1* | 6/2015 | Li | G06F 16/24557 |
| | | | 707/718 |
| 2016/0246841 A1* | 8/2016 | Pesala | G06F 16/244 |
| 2018/0157710 A1* | 6/2018 | Guirguis | G06F 16/24545 |
| 2020/0034191 A1* | 1/2020 | Tarasuk-Levin | G06F 9/4856 |

* cited by examiner

DYNAMIC TRANSACTION COALESCING

CROSS REFERENCE TO RELATED APPLICATION

This application claims priority to and the benefit of U.S. Provisional Application No. 62/870,627, filed Jul. 3, 2019, the disclosure of which is incorporated, in its entirety, by this reference.

BACKGROUND

In computing environments, clients and servers communicate with each other over data networks to exchange information. This data is often used by client applications to perform certain operations. Because backend servers often provide data to many thousands or millions of clients, these servers typically limit the number of queries they are willing to accept from any given client over a given timeframe (e.g., one second, or one minute, or one hour, etc.). As such, clients are usually limited in how often they can send data requests to the backend servers and get back a successful response. Further complicating this process is the nature of the data queries themselves: some queries may be related to critical tasks and may thus have tight deadlines, while other queries may be related to background tasks, for example, that have relaxed deadlines. Processing these queries together as a batch may cause query deadlines to be missed. Still further, some queries may be fulfilled using cached server data, while other queries may require live server data. Simply combining queries into a common batch without regard to these variabilities may lead to poor client-server communications.

SUMMARY

As will be described in greater detail below, the present disclosure describes methods and systems for implementing and managing dynamic transaction coalescing within a system. In the embodiments described herein, these systems and methods organize queries into execution windows and then execute those execution windows whenever at least one query's trigger or one execution window's trigger has occurred.

In one example, a computer-implemented method for implementing and managing dynamic transaction coalescing in a system includes establishing a coalescing service configured to combine queries received at the coalescing service. The method further includes instantiating, within the coalescing service, multiple execution windows to which the received queries are to be assigned, where each execution window has an assigned deadline within which to execute. The method also includes analyzing at least a first query among the received queries to identify various characteristics of the first query. The method next includes assigning the first query to a first execution window among the execution windows according to the identified characteristics and, upon detecting the occurrence of a specified trigger for at least one of the queries in the first execution window, executing those queries, including the first query, that are assigned to the first execution window.

In some examples, each of the queries that were assigned to the first execution window before the occurrence of the trigger is executed during execution of the first execution window. In some embodiments, the specified trigger includes reaching the deadline assigned to the first execution window. In some cases, the deadline assigned to the first execution window is established as a default trigger if other triggers for other queries are not detected.

In some embodiments, each execution window has a current state that is changeable by the coalescing service based on detecting the occurrence of the specified trigger. In some cases, each execution window has an identifier that uniquely identifies the execution window within the established coalescing service. In some examples, the established coalescing service assigns a variable to one or more of the execution windows.

In some cases, the identified characteristics of the first query include one or more of the following: type of query, type of information being queried, criticality of query, type of database being queried, size of query, or tolerance of latency. In some examples, the received queries are assigned to execution windows based on various portions of knowledge about a backend system to which the queries are sent upon execution of the execution window.

In some examples, the various portions of knowledge about the backend system are inferred based on interactions with the backend system. In some embodiments, the various portions of knowledge about the backend system include one or more of the following: backend latency requirements, backend partitions, maximum number of queries per token bucket, or location of backend servers. In some cases, queries satisfied by data stored on a specified backend partition are assigned to the same execution window.

In addition, a corresponding system may include at least one physical processor and physical memory comprising computer-executable instructions that, when executed by the physical processor, cause the physical processor to establish a coalescing service configured to combine queries received at the coalescing service. The processor further instantiates, within the coalescing service, multiple execution windows to which the received queries are to be assigned, where each execution window has an assigned deadline within which to execute. The processor then analyzes at least a first query among the received queries to identify various characteristics of the first query and assigns the first query to a first execution window among the various execution windows according to the identified characteristics. The processor also, upon detecting the occurrence of a specified trigger for at least one of the queries in the first execution window, executes those queries, including the first query, that are assigned to the first execution window.

In some examples, the processor receives queries from multiple different agents, where each agent is configured to execute a specified workload. In some cases, the processor receives at least a portion of the received queries as hardware interfaces (including elastic network interfaces (ENIs)) are updated for the agents. In some embodiments, the ENIs for the agents are updated automatically upon the occurrence of a specified trigger. In some cases, the processor is configured to detect the occurrence of errors upon executing the queries assigned to the first execution window. The processor then performs remediation steps to remediate the detected errors. The remediation steps include resubmitting the queries in the first execution window or splitting up the queries in the first execution window into different execution windows for subsequent resubmission. In some cases, the logic used to split up the queries may be driven by feedback from the error response. In such cases, the queries are split up into different execution windows based on which steps were taken to remediate the detected errors.

In some examples, the above-described method is encoded as computer-readable instructions on a computer-readable medium. In one example, a computer-readable medium includes one or more computer-executable instructions that, when executed by at least one processor of a computing device, cause the computing device to instantiate, within the coalescing service, multiple execution windows to which the received queries are to be assigned, where each execution window has an assigned deadline within which to execute. The instructions then analyze at least a first query among the received queries to identify various characteristics of the first query and assign the first query to a first execution window among the various execution windows according to the identified characteristics. The instructions also, upon detecting the occurrence of a specified trigger for at least one of the queries in the first execution window, execute those queries, including the first query, that are assigned to the first execution window.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
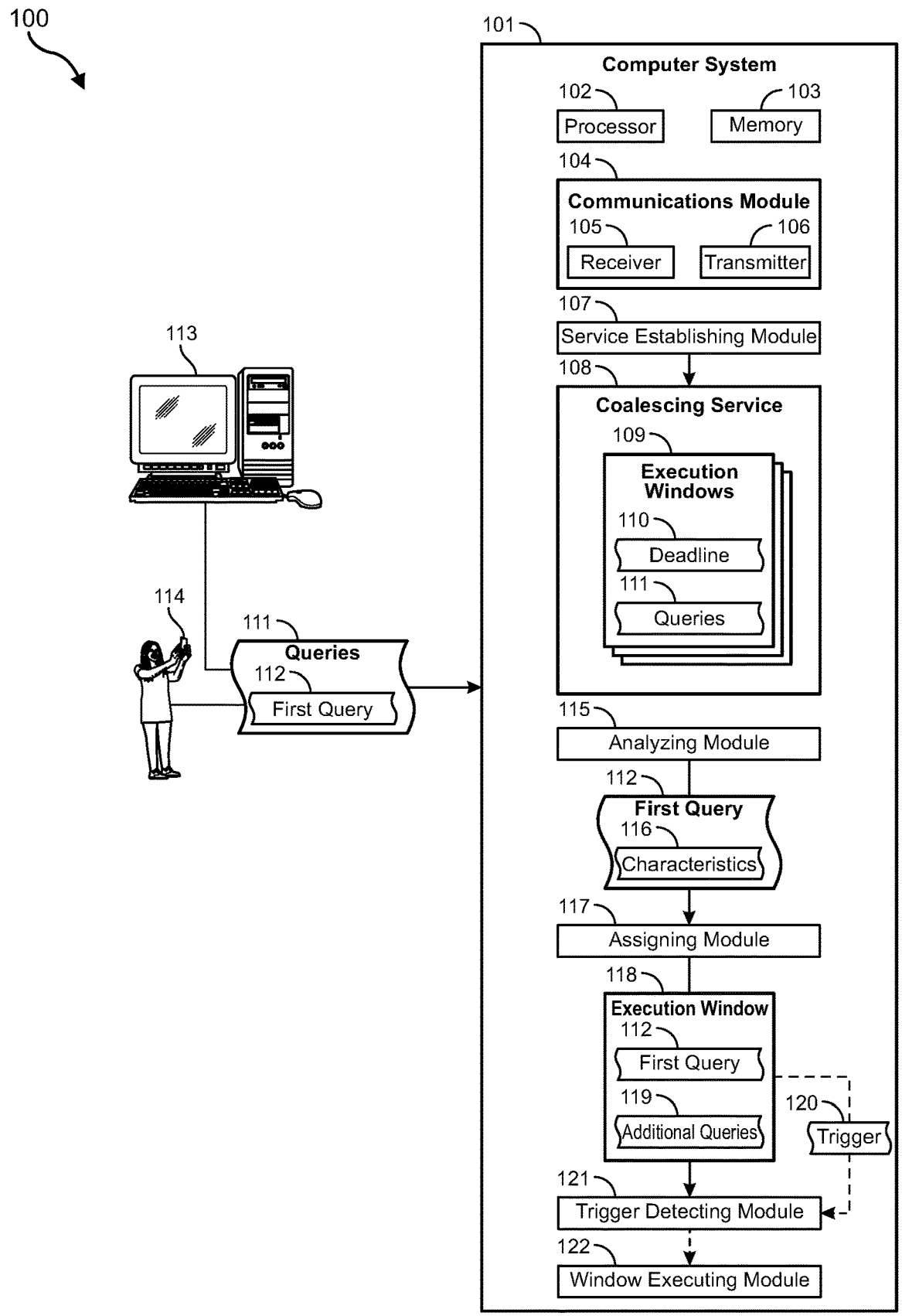
FIG. 1 illustrates a computing architecture in which the embodiments described herein may operate.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for implementing and managing dynamic transaction coalescing within a system. As noted above, client applications or hardware devices often query backend servers for data including application data, configuration data, backup data, or other types of data. When generating these queries, clients may not be aware of how the backend server handles those requests and may overload the backend server with too many queries. This may be especially true in distributed systems where many thousands or millions of clients are sending queries to backend servers. The servers may become overloaded and may crash or may be delayed in their responses.

To combat the barrage of queries from potentially millions of different clients (or from a smaller number of clients submitting a large number of queries, perhaps within a tight window of time), some traditional backend servers have established a token bucket system that limits the number of queries that can be received and processed by the backend servers at any given time. For instance, some backend servers may allow a certain number of queries to come in and may deposit those queries in a token bucket. This may be based on the limited capacity of the backend servers and/or based on an attempt to reduce cost by limiting the capacity of the backend servers. Once the token bucket fills up, further queries are held off and placed in another token bucket. In this manner, token buckets allow backend servers to handle large loads of queries without crashing or introducing delays in responses. The client devices and applications sending the queries, however, are typically unaware of how the backend servers operate. The client applications or hardware (e.g., a network interface card) may be configured to send queries as soon as the queries are generated, thereby inundating the backend with waves of client queries that are generated and sent out without regulation.

As will be explained in greater detail below, embodiments of the present disclosure establish execution windows that gather client queries and hold those queries back until a specified time has been reached or until a trigger for one of the client queries or a trigger for the execution window has been met. For example, five different clients (e.g., client devices or client applications) may each generate a query that is to be sent to a backend server. Instead of each client sending the queries as soon as the queries are generated, a transaction coalescing service coalesces or gathers the queries into execution windows. The execution windows each have an assigned deadline after which the queries in that execution window will execute (i.e., they will be sent to the backend server for fulfillment). In some cases, the queries will sit in this execution window until the execution window's deadline is reached or until a triggering event occurs, after which time the execution window will "execute" and send the queries to the backend server.

In other cases, the execution window will execute before the execution window's deadline. In at least some cases, the execution windows are triggered to execute when a query is received having a trigger that initiates execution of the execution window. As such, the queries themselves may have triggers that, when met, cause execution of the execution window to which they are assigned. For instance, some queries are more critical than others, and some may need to be processed sooner than others. Thus, some of the queries have their own specifications or characteristics indicating that they are to be executed upon the occurrence of their corresponding trigger(s). In such cases, if one of these trigger conditions occurs before the execution window's deadline (to which the query is assigned), the execution window is nonetheless executed in order to satisfy the query whose trigger condition occurred. This allows ordinary queries to be processed at a reasonable time according to the execution window's deadline (which itself is a form of a trigger), and also allows the flexibility for other triggering actions to occur that would cause the queries in the execution window to be sent early. Furthermore, at least some of the embodiments described herein have gained either inferred or explicit knowledge about the backend servers. These embodiments then use this knowledge to group the queries in an advantageous manner based on the knowledge of how the backend server operates. These concepts will be described further below with regard to FIGS. 1-9G.

FIG. 1 illustrates a computing environment 100 that includes a computer system 101. The computer system 101 includes software modules, embedded hardware components such as processors, or includes a combination of hardware and software. The computer system 101 includes substantially any type of computing system including a local computing system or a distributed (e.g., cloud) computing system. In some cases, the computer system 101 includes at least one processor 102 and at least some system memory 103. The computer system 101 includes program modules for performing a variety of different functions. The program modules are hardware-based, software-based, or include a combination of hardware and software. Each program module uses computing hardware and/or software to perform specified functions, including those described herein below.

The computer system 101 includes a communications module 104 that is configured to communicate with other computer systems. The communications module 104 includes any wired or wireless communication means that can receive and/or transmit data to or from other computer systems. These communication means include hardware interfaces including Ethernet adapters, WIFI adapters, hardware radios including, for example, a hardware-based receiver 105, a hardware-based transmitter 106, or a combined hardware-based transceiver capable of both receiving and transmitting data. The radios are cellular radios, Bluetooth radios, global positioning system (GPS) radios, or other types of radios. The communications module 104 is configured to interact with databases, mobile computing devices (such as mobile phones or tablets), embedded or other types of computing systems.

The computer system 101 also includes a service establishing module 107. The service establishing module 107 is configured to establish various applications or services including coalescing service 108. The coalescing service 108 runs solely on computer system 101, or runs solely on another computer system, or runs on multiple (e.g., distributed) computer systems. The coalescing service 108 is configured to group, batch, or "coalesce" multiple queries together into an execution window or into a series or "wheel" of execution windows. Each execution window (e.g., 109) has an associated deadline 110, along with a current state (e.g., idle, executing, retired, etc.) and potentially an identifier that uniquely identifies the execution window. Each execution window 109 includes substantially any number of queries 111. In some cases, for example, the computer system 101 receives queries 111 from computer systems (e.g., 113), from users (or, more specifically, from their electronic devices (e.g., 114)), or from other entities. The queries are designed to request some portion of information from a backend server. The requested information relates to application data, state data, hardware configuration data, or other types of data. The computer system 101 receives many different queries from many different devices and many different types of devices. The coalescing service 108 coalesces these queries into different execution windows 109.

For instance, in one embodiment, the coalescing service 108 receives queries 111, including first query 112. The first query 112 is one query among potentially many queries. The coalescing service 108 gathers the first query 112 and other queries received from computer system 113 and/or electronic device 114 (or other devices) into first execution window 118. In some cases, the queries 111 are assigned to the first execution window 118 based on certain characteristics. Indeed, each query may have different characteristics 116. In some cases, the analyzing module 115 of computer system 101 analyzes the received queries 111 to determine these characteristics 116. The characteristics include, for example, the type of query, the data or data type requested in the query, the size of the requested data in the query, the amount of data requested in the query, the physical location of the backend server(s) to which the query is to be sent, the criticality of the query (indicating its execution priority relative to other queries), the deadline of the query, or other characteristics that affect when the query is to be processed relative to other queries.

Once the analyzing module 115 has identified these characteristics 116, the assigning module 117 then assigns the queries 111 to a given execution window (e.g., 118). Each execution window may also have its own characteristics including deadlines by which the execution window is to be executed. When an execution window executes, the window executing module 122 sends the combined queries in that window to the backend servers for fulfillment. In some cases, the execution windows 109 execute according to a schedule, with each execution window having a specified deadline. In some cases, for example, as will be explained further below with regard to FIG. 3, the execution windows are aligned in a sequential wheel or "cogwheel." In this cogwheel, the window executing module 122 executes each execution window as the wheel turns and as the next cog (i.e., execution window) comes up for execution. This progressive execution of execution windows, however, is truncated in some instances based on the occurrence of other triggers 120 (e.g., from additional queries 119) that cause the execution window to execute early (i.e., before its designated deadline).

The trigger detecting module 121 of computer system 101 is configured to continuously monitor for triggers 120 associated with the queries 111 or with the execution windows 109. If one of these trigger events occurs, the trigger detecting module 121 will indicate to the window executing module 122 that the trigger has occurred, and the window executing module will execute all the queries assigned to that execution window. Thus, even though a specific execution window may have been scheduled for execution at a specified deadline according to the cogwheel, the occurrence of a trigger event for any given query will initiate the immediate execution of an execution window, including any queries in that execution window. These concepts will be described further below with regard to Method 200 of FIG. 2.

Figure 2:
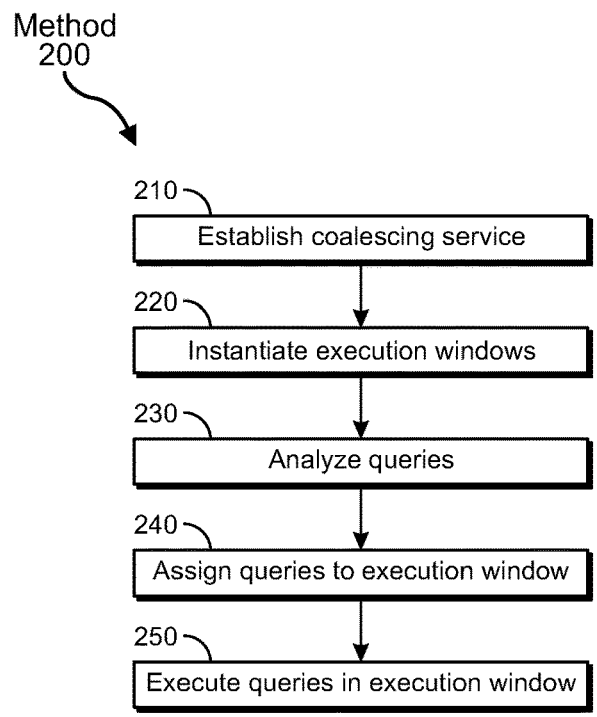
FIG. 2 illustrates a flow diagram of an exemplary method for implementing and managing dynamic transaction coalescing.
Figure 3:
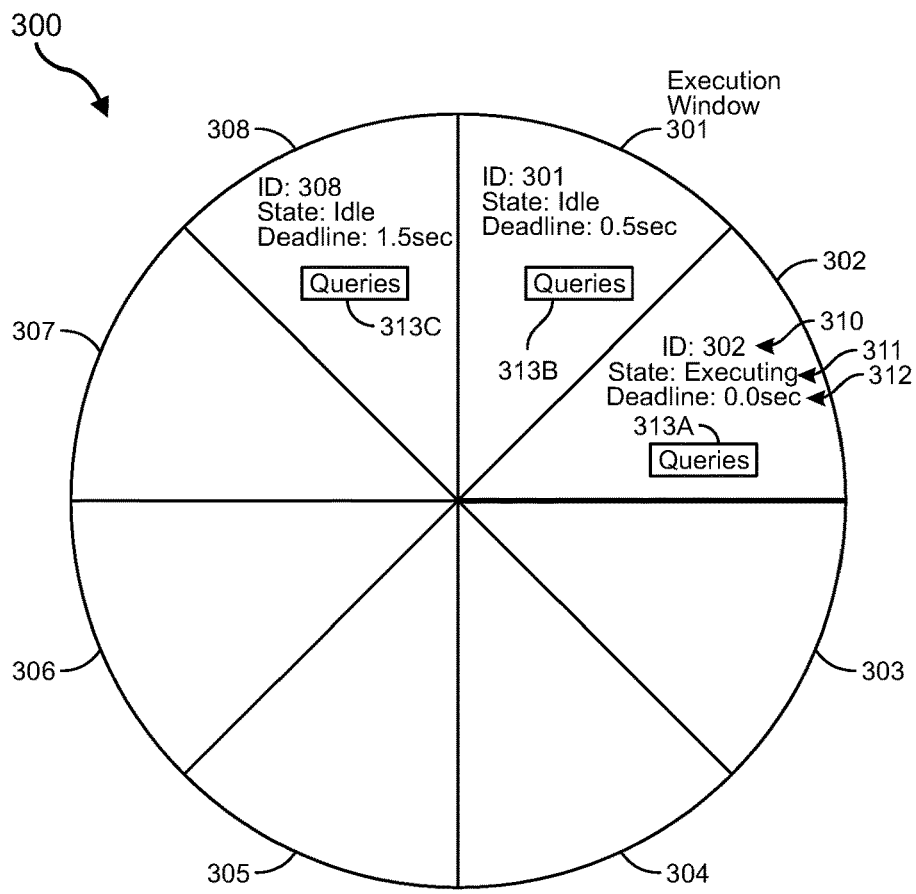
FIG. 3 illustrates an embodiment of a transition element in which execution windows and their associated queries are arranged and executed.

FIG. 2 is a flow diagram of an exemplary computer-implemented method 200 for implementing and managing dynamic transaction coalescing within a system. The steps shown in FIG. 2 may be performed by any suitable computer-executable code and/or computing system, including the systems illustrated in FIG. 1. In one example, each of the steps shown in FIG. 2 may represent an algorithm whose structure includes and/or is represented by multiple substeps, examples of which will be provided in greater detail below.

As illustrated in FIG. 2, at step 210 one or more of the systems described herein establishes a coalescing service that is configured to combine queries received at the coalescing service. For instance, in some cases, the service establishing module 107 of computer system 101 establishes coalescing service 108. The coalescing service 108 is configured to combine queries in a specified manner. In some embodiments, this includes combining the queries in a manner that takes advantage of the way in which the backend servers to which the queries are to be sent are configured to operate. In other cases, the coalescing service 108 coalesces queries and assigns the queries to execution windows according to query characteristics 116. These assignments, however, are preceded by the creation of the execution windows by the coalescing service 108.

Indeed, step 220 of Method 200 includes instantiating, within the coalescing service 108, multiple execution windows 109 to which the received queries 111 are to be assigned. Each execution window has an assigned deadline 110 within which to execute. For example, in the embodiment shown in FIG. 3, the execution windows are arranged in a cogwheel that, in this case, turns clockwise. Each execution window (e.g., 301-308) is initially established to execute sequentially, one after the other, with the "execution line" or point at which the windows are executed being set at the 3 o'clock position. In such cases, the execution window arriving at the 3 o'clock position as the cogwheel 300 turns clockwise is the execution window that is scheduled to execute next. Thus, in the embodiment of FIG. 3, execution window 302 has a deadline 312 of 0.0 seconds, indicating that the deadline has been reached and that execution window 302 is executing (as shown by state 311). The ID 310 identifies the execution window 302 uniquely from the other execution windows 303-308 and 301. Each execution window has a different set of queries 313A-C. Those queries 313A-C assigned to the execution window 302 are thus being executed or sent to the backend server for fulfillment. Execution window 301 is sequentially next in line with a deadline of 0.5 seconds, followed by execution window 308 with a deadline of 1.5 seconds. In some cases, the execution windows are set to execute at a regularly spaced time at the end of the previous window (e.g., every 1 second, or every 5 seconds, or every 30 seconds, or every minute, or every hour, etc.). In other cases, the execution deadlines vary in duration. The coalescing service 108 continually adds new cogs (i.e., new execution windows) to the cogwheel 300 as it receives new queries.

As noted above, each query has certain characteristics or features. These features may indicate that a specific query is to be executed upon the occurrence of a trigger. The method 200 thus includes step 230 which analyzes at least a first query among the received queries to identify various characteristics of that first query. The analyzing module 115, for example, access the queries 111, including the first query 112, and identifies one or more characteristics 116 related to that query. In some cases, for example, the characteristics 116 indicate that the first query 112 is highly critical and is to be executed as soon as possible. In other cases, the characteristics 116 indicate that the first query 112 is related to a background task and can thus be executed at a later time. In some cases, the characteristics 116 indicate that the query can tolerate latency at the backend server, and can thus be sent along with a large number of other queries. In still other cases, the characteristics 116 indicate that the query cannot tolerate latency at the backend server, and thus needs to be sent alone or in a relatively small group of queries, so as not to overly burden and slow the processing on the backend server. Many other characteristics may also be identified by analyzing module 115. The assigning module 117 may use any or all of these characteristics to assign the queries to an appropriate execution window.

Next, at step 240 of Method 200, the assigning module 117 assigns the queries 111, including the first query 112, to a first execution window 118 among the execution windows 109 according to the identified characteristics 116. For instance, as noted in the above examples, some queries are able to handle latency, while others are not. Some queries are critical or are designed to query data that is to be fetched as quickly as possible. Other queries are directed to specific types of data, or are directed to data belonging to a given user or entity. Each of these queries thus has an associated trigger corresponding to the identified characteristics 116. If a query needs backend server latency to be below a certain threshold, once the threshold number of queries has been assigned to a given execution window, the trigger 120 has been met and the window executing module 122 will execute that execution window substantially immediately. At least in some cases, this trigger-based execution happens regardless of any scheduled deadline associated with the execution window. Accordingly, step 250 of Method 200 includes, upon detecting the occurrence of a specified trigger 120 for at least one of the queries in the first execution window 118, executing those queries, including the first query 112, that are assigned to the first execution window. As will be shown in FIGS. 4 and 5, the execution of execution windows based on triggers may occur out of order with respect to the cogwheel and may occur in substantially any order according to which trigger events occur.

Figure 4:
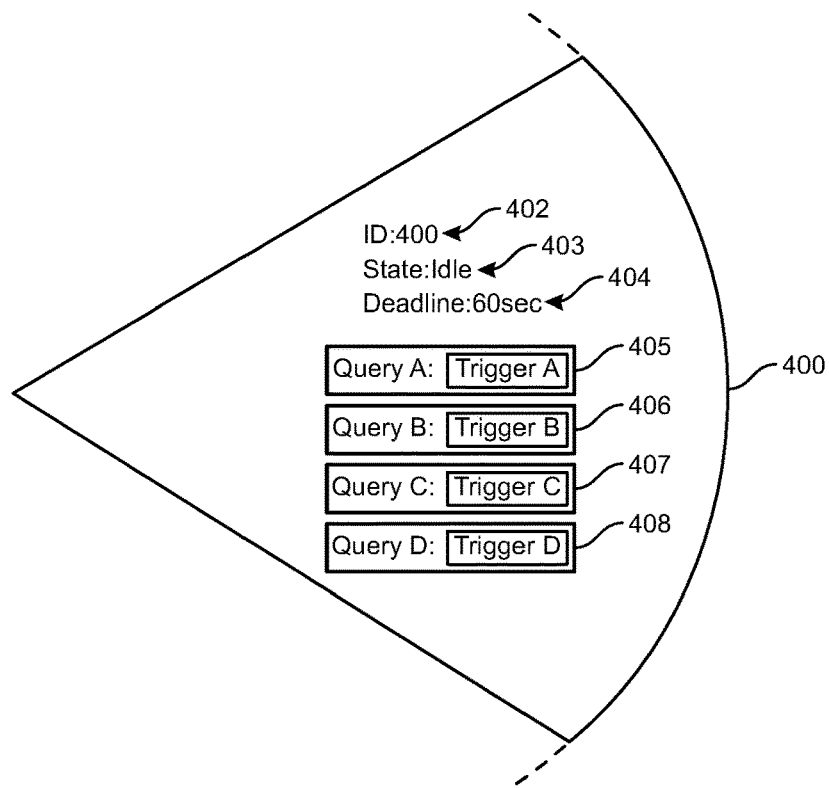
FIG. 4 illustrates an embodiment of a portion of a transition element in which an execution window and its associated queries are executed based on triggers.

FIG. 4 illustrates an embodiment of an execution window 400 that has been assigned multiple queries (e.g., by the assigning module 117 of FIG. 1). The execution window includes, for example, query A (405) that has trigger A, query B (406) that has trigger B, query C (407) that has trigger C, and query D (408) that has trigger D. It will be understood here that the execution window 400 may include substantially any number of queries, including more or fewer than the four queries shown. The execution window 400 also includes an ID 402, a state 403, and a deadline 404. The execution window 400 may also have its own set of trigger events. Still further, each query may have a different trigger or may have the same trigger as another query, or may have no trigger at all, for example, indicating that that query is ok to execute at the deadline of the execution window, whenever that occurs. In the embodiment shown in FIG. 4, each query 405-408 includes its own unique trigger. Thus, for instance, in one example, trigger A is a specified maximum threshold number of queries. As soon as that number (e.g., 50 queries) is reached in the execution window 400, the execution window will execute that query and the other 49 queries assigned to it substantially immediately. In some cases, the trigger B associated with query B is a level of criticality. If the level of criticality associated with query B is beyond a specified threshold level, the execution window 400 will execute, even if the execution window deadline 404 is not met. At such a point, the execution window's state 403 changes from idle to executing, and the coalescing service sends the queries in that execution window to the backend server.

Figure 5:
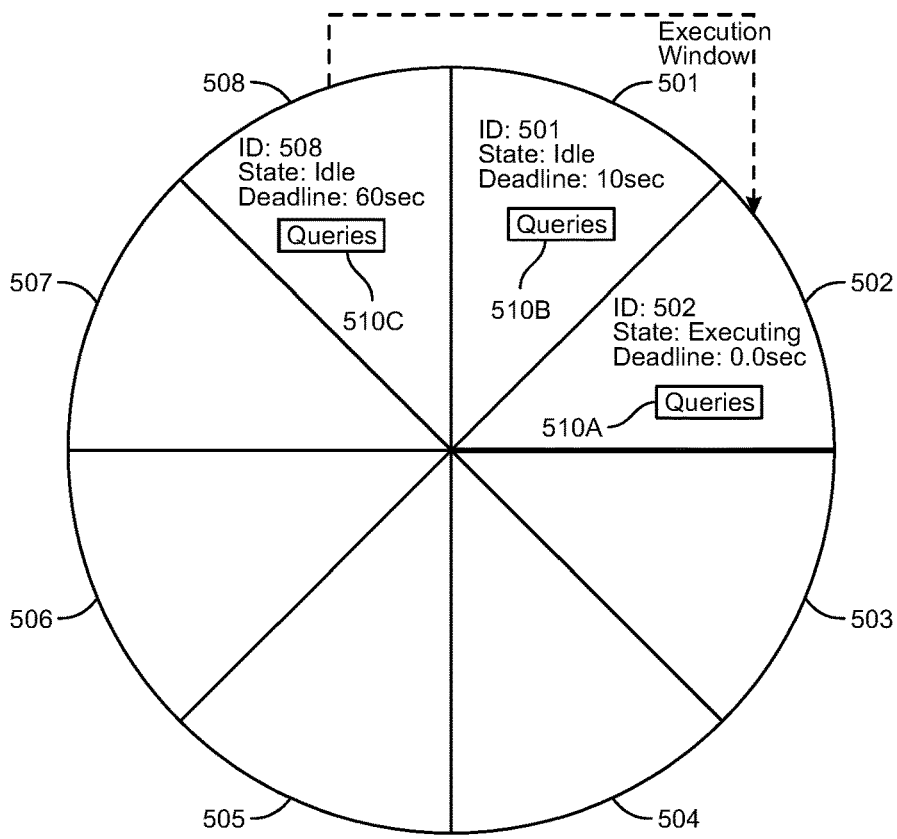
FIG. 5 illustrates an embodiment of a transition element in which an execution window is moved ahead in execution according to query triggers.

For example, FIG. 5 illustrates an embodiment in which the underlying coalescing service (e.g., 108 of FIG. 1) executes an execution window out of order. The execution windows 501-508 are arranged in a cogwheel similar to or the same as the cogwheel 300 of FIG. 3 (although other sequential or non-sequential arrangements are also possible). The execution window 502 is currently executing, as indicated by its state. As such, the window executing module 122 of FIG. 1, for example, is sending the queries 510A to the backend server for fulfillment. The execution window 501 is next on deck for execution in 10 seconds time. However, in this example, at least one of the triggers for the queries 510C occurs. As such, the window executing module 122 changes the execution state of execution window 508 to executing and begins transferring the queries 510C to the backend servers, even though the deadline for execution window 508 has not yet occurred. As such, the window executing module 122 executes all of the queries 510C in execution window 508 before the queries 510B of execution window 501. In similar manner, if the triggers for any of the queries assigned to execution windows 503-507 were to occur, the window executing module 122 would move the status of those execution windows to executing and would transmit those queries to the backend servers. In this manner, queries are assigned to specific execution windows based on their characteristics and are lined up for (at least a planned) sequential execution. However, whenever a trigger condition occurs, the coalescing service executes the query for which the trigger applied, along with the other queries in that execution window. This process will be described further below with regard to FIGS. 6-9F.

Figure 6:
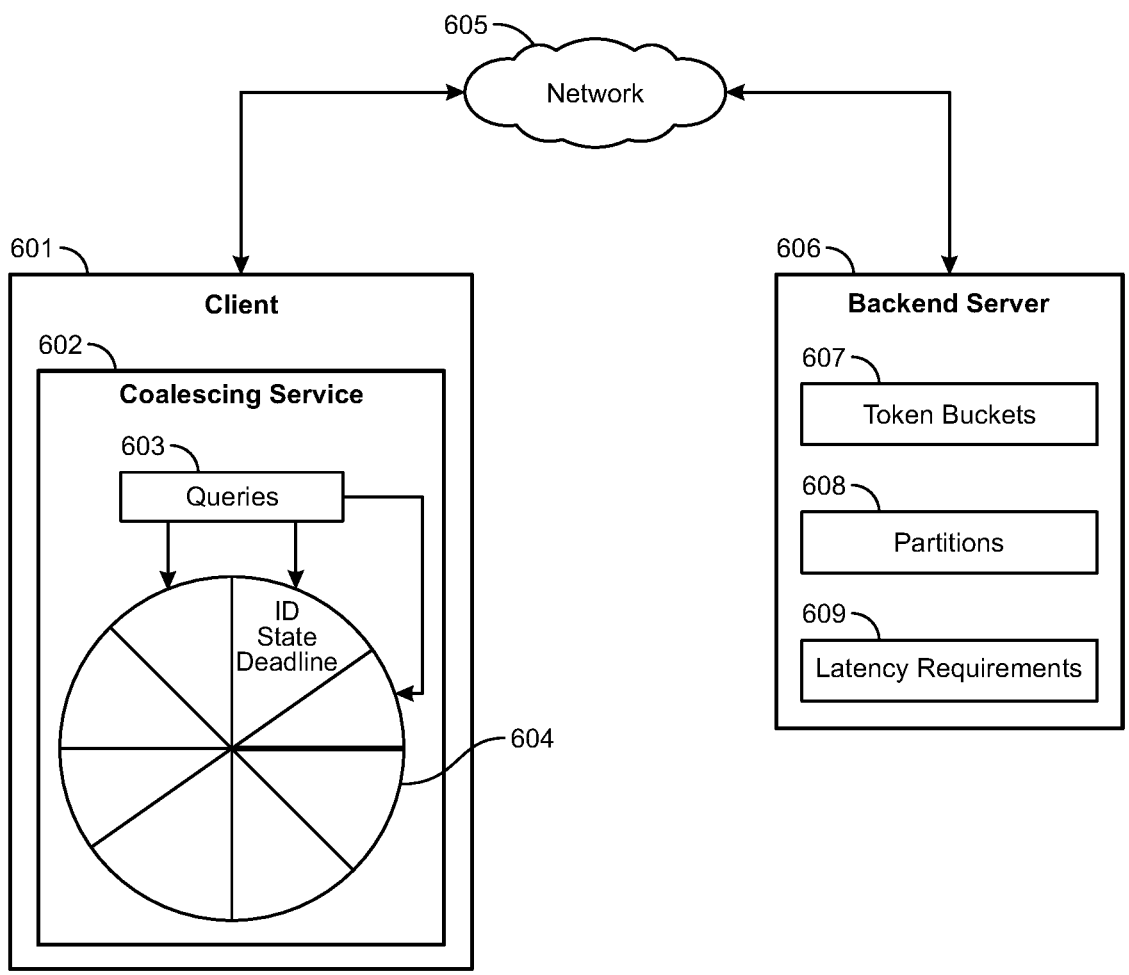
FIG. 6 illustrates an embodiment in which a coalescing service implements knowledge of backend servers when coalescing queries.

FIG. 6 illustrates an embodiment in which a client 601 is communicating with a backend server 606 through a wired or wireless network 605. The client may include or may communicate with or may have instantiated thereon a coalescing service 602. In some cases, the coalescing service 602 runs on the client 601, while in other cases, the coalescing service 602 runs on a different computing system (e.g., computer system 101 of FIG. 1). In the embodiment shown in FIG. 6, the coalescing service 602 assigns queries 603 into different execution windows 604, where each execution window has an identifier, a current operational state, and a scheduled deadline. Once the execution window hits the scheduled deadline or a trigger event related to the execution window has occurred, the coalescing service will send the queries 603 in that execution window over the network 605 to the backend server 606. In some cases, this scheduled deadline acts as a default trigger whose occurrence is set to happen at a specific time. Once the deadline (i.e., the default trigger) hits, the coalescing service 602 executes the queries 603 that were grouped into that execution window.

In some cases, execution windows may gradually fill up with queries. For example, in some embodiments, the coalescing service 602 receives data or configuration queries from different computer systems including client devices, agents, virtual operating systems, or other types of computer systems. As noted above, each of these queries has different characteristics and traits. The coalescing service 602 assigns the queries as they come into different execution windows. Over time, the execution windows thus begin to fill up with queries and potentially different types of queries. Many of these queries have different triggers that will cause the query to execute. In at least some cases, once a query trigger is triggered, each of the queries that had been assigned to the execution window to which the query belonged up to that point will be executed. The coalescing service 602 will then change the current state of the execution window from idle to executing. In this process, the coalescing service moves the triggered execution window ahead of other execution windows and executes that execution window without delay (e.g., as described above with reference to FIG. 5).

In some cases, the coalescing service 602 assigns queries to certain execution windows based on knowledge about the backend server 606. This knowledge may include knowledge about how the backend server 606 processes incoming queries, or may include knowledge about how the backend server stores data (e.g., in which partitions it stores certain data), or may include knowledge about latency requirements involved with some types of data. Other types of knowledge about the backend server 606 may also be used. Thus, when the coalescing service 602 is assigning queries to execution windows, the coalescing service uses this knowledge to group similar types of queries together. For example, because (at least in some cases) the deadline assigned to each execution window is variable, the coalescing service 602 determines which execution window will be the best fit based on the currently scheduled deadline for that execution window. The coalescing service 602 is configured to reschedule an established deadline for an execution window, or to reassign queries to other execution windows as needed. In some cases, the coalescing service 602 groups similar queries into the same execution window based on characteristics in light of the variable, scheduled deadlines of each execution window.

For example, in some cases, the coalescing service 602 identifies characteristics of the queries including the type of query, the type of information being queried, the criticality of query, the type of database being queried, the size of query, or latency tolerance for the query. In some embodiments, these characteristics indicate that some queries should be executed before other queries. Thus, queries that are the highest priority are assigned to execution windows that have short deadlines, while queries that have lower priority are assigned to execution windows with longer deadlines. In addition to time-based priority (or as an alternative thereto), the coalescing service 602 assigns queries to execution windows based on knowledge about the backend server 606. Knowledge about the token buckets 607, for example, indicates that the backend server 606 receives and processes queries using token buckets. In the token bucket system, the backend server 606 receives queries into a token bucket and, once that token bucket is full, the server processes the queries. In such cases, the coalescing service 602 uses this knowledge about the maximum number of tokens per bucket to group specified numbers of queries 603 into execution windows that either match or substantially match the maximum number of queries processed in each token bucket.

Still further, the coalescing service 602 also uses knowledge about data partitions 608, at least in some embodiments, to group queries into execution windows 604. In some cases, the backend server 606 stores similar types of data, or data belonging to the same client, or data of a specific size, in the same data partition 608. Data within the same partition is usually quicker to access than data spread over multiple partitions. Moreover, queries that request data from data within the same partition may experience less latency or less variability in the amount of latency experienced. As such, the coalescing service 602 can make a note of where the data for certain queries are stored. Then, when grouping and assigning queries to execution windows, the coalescing service 602 assigns those queries that will be fulfilled by the same data partition to the same execution window. As such, when that execution window executes, all (or nearly all) of its queries will go to the backend server 606 and will be fulfilled from the same partition. This increases efficiency in data retrieval, resulting in faster data accessing times, less latency, less variability in latency, and faster overall data transfer times to the client 601. Grouping the queries bound for the same data partition 608 into the same execution window thus leads to large gains in efficiency when requesting, retrieving, and receiving data query results.

Knowledge about the backend server 606 also includes latency requirements 609. Some data requests are directed to background data and are neither urgent nor critical. As such, the latency requirements for such data are low (meaning the data request can tolerate a higher amount of latency). Other data requests are directed to real-time data including financial information, streaming data (e.g., streaming video data), application-critical data (without which an application would fail), hardware configuration data (without which the hardware (e.g., a network controller) will not work properly), or other similar types of data are both urgent and critical (meaning that the data is needed now and is highly important). Other data types or data streams have different latency requirements 609. As such, at least in some cases, the coalescing service coalesces queries that have similar latency requirements and assigns those queries to the same or to corresponding execution windows. Thus, in this manner, the coalescing service logically groups queries according to shared characteristics or similarities based on backend server knowledge or based on other information. In some cases, the coalescing service infers this backend server knowledge based on data access times, data transfer speeds, server names, internet protocol (IP) or media access control (MAC) addresses, server locations, based on data packet header information, or based on other information. In other cases, the coalescing service gains this knowledge explicitly (e.g., the client 601 is told how the backend server 606 operates).

Figure 7:
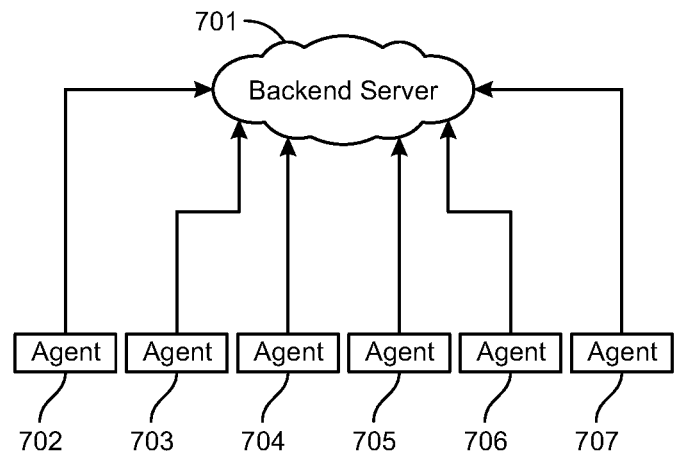
FIG. 7 illustrates an embodiment in which multiple agents are communicating with a backend server.

In some embodiments, multiple different agents send the queries 603 to the backend server. Each agent may be an application, service, computer system, or other executing agent configured to execute a specific workload. For example, as shown in FIG. 7, multiple different agents 702-707 send queries to backend server 701. In some cases, for instance, the agents send queries to the backend server 701 as part of a hardware and/or software reconfiguration. If the agent computer systems or applications are brought down either on purpose or due to a failure, the agents may be designed to reconfigure some or all of their hardware components. In some cases, these hardware components include elastic network interfaces (ENIs). In one example, one or more of the agents 702-707 experiences a failure and ceases to operate correctly. That agent is rebooted or reinstantiated and, as part of that process, the agent issues a query to reconfigure its ENI or other hardware component. If many hundreds or thousands of these agents send the reconfiguration queries at the same time, the backend server 701 is likely to be overwhelmed. Additionally or alternatively, other triggers may initiate the automatic update of an ENI or other hardware component. When these triggers occur, many agents attempt to simultaneously update their hardware components, thus flooding the backend server 701 with requests.

Some backend servers (e.g., 701) have request rate limits. As noted above, some rate limiting systems use a token bucket system. The token buckets start with a specified value (e.g., a burst value), and then refill the buckets at a given rate per second (e.g., the refill rate). In some embodiments, for example, the rate limit values are between 200-500 burst and between 50-90 refills/sec. The queries that fill the token buckets may be issued by agents 702-707 (or by other agents). In some cases, the agents are requesting updates to their elastic network interfaces. The ENI is a virtual network interface that can be attached to an instance of a virtual private cloud (VPC), for example. Each query can request an ENI update for the agent that issued the query and may also request ENI (or other hardware component) updates for other agents. Regardless of whether the requests are sent in a single query or in multiple queries, each request for configuration data is dealt with individually by the backend server 701 and thus adds to the token bucket rate limit.

Figure 8:
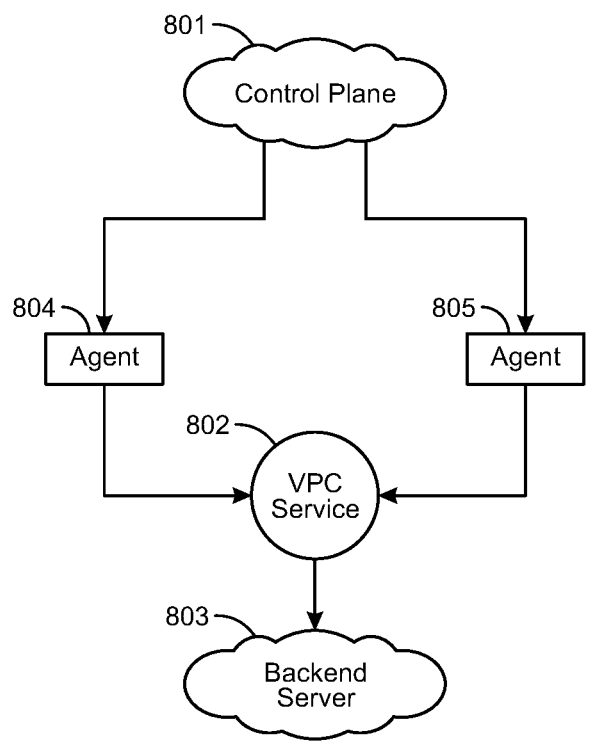
FIG. 8 illustrates an embodiment in which a virtual private cloud (VPC) service routes queries to the backend server.

A client-side VPC service, such as 802 of FIG. 8 may be designed to implement application programming interfaces (APIs) to configure networking hardware or software components for these agents (e.g., 804 and 805). Instead of each agent individually interacting on its own with the backend server 803, the client-side VPC Service acts as an intermediary between the agents 804/805 (or other agents) and the backend server 803. When failures occur (especially large-scale failures in which multiple agents are brought down), each agent attempts to query and reconfigure itself using configuration data from the backend server 803. In other cases, the networking control plane 801 (that governs the agents' communications) may need to be updated when multiple agents are launched at the same time, or when security groups are organized among the agents. Each of these events may result in multiple calls to the backend server 803, as each reconfiguration uses multiple calls. The VPC service 802 coordinates changes across the agents 804/805 and thus receives and aggregates their queries before sending the queries to the backend server 803.

Accordingly, rather than having each agent send requests to the backend server 803 individually, the system instantiates one or more VPC services to coordinate the updating among the agents. The VPCs (e.g., 802) implement query coalescing to group or gather the queries into execution windows (e.g., 900 of FIG. 9A). The VPC service 802 implements a query coalescing algorithm to coalesce the queries into execution windows. In some cases, as referenced with FIG. 3, the query coalescing algorithm is based on a wheel-style model. Within the query coalescing algorithm, various triggers cause the generation of a query. Each of these triggers has different latency and reliability requirements. For example, a non-user-interactive query such as garbage collection may be able to wait 1 second before returning. On the other hand, an instance setup call may be able to wait 15 seconds. In some cases, an agent configuration query has a latency requirement of 100 milliseconds. As such, if 100 ms is the lower bound of query latency, the VPC may guarantee that no more than 10 queries per second (QPS) per agent are sent to the backend server. Queries with similar latency and reliability requirements are grouped together by the VPC into similar execution windows.

Figure 9B:
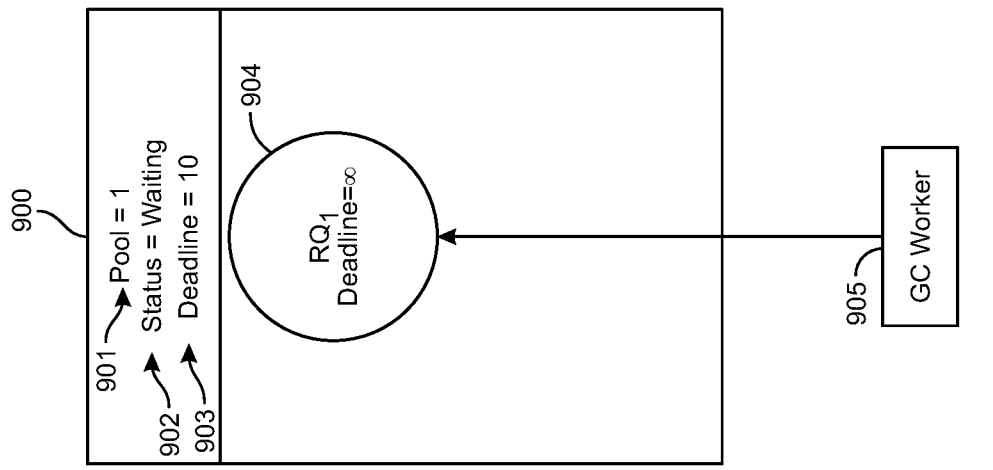
FIGS. 9A-9G illustrate embodiments in which execution windows and their associated queries are arranged and executed.
Figure 9A:
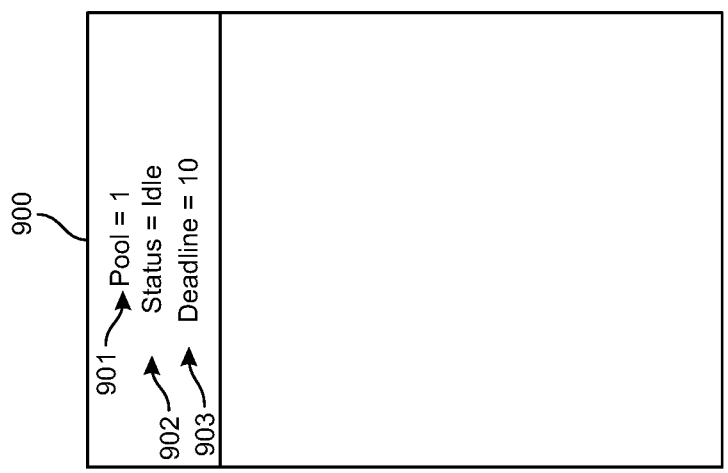
Figure 9D:
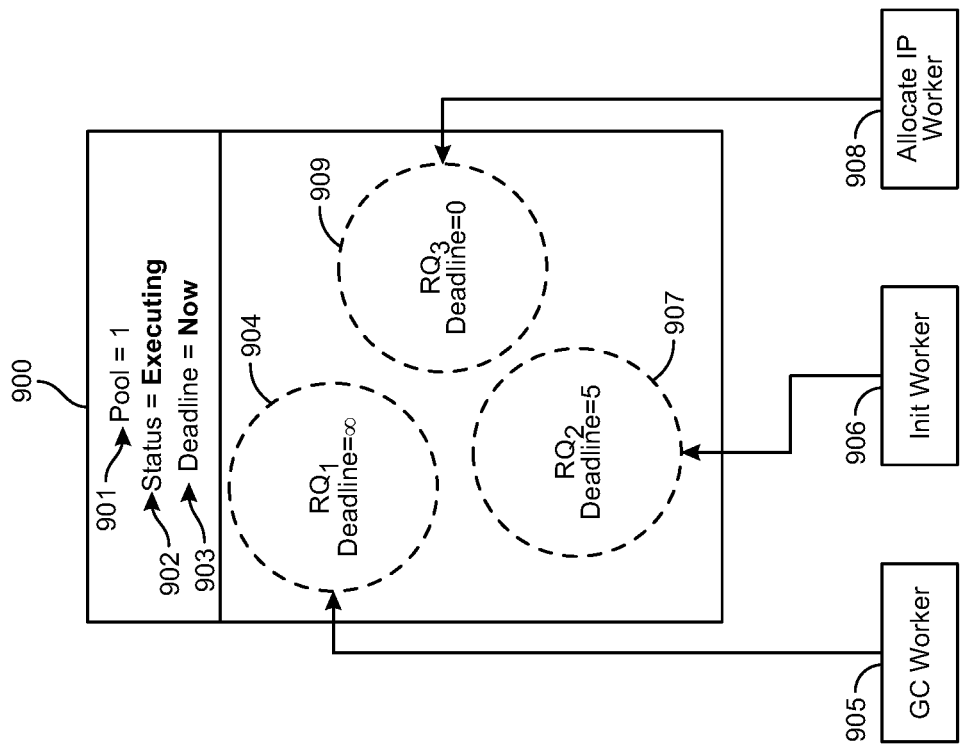
Figure 9C:
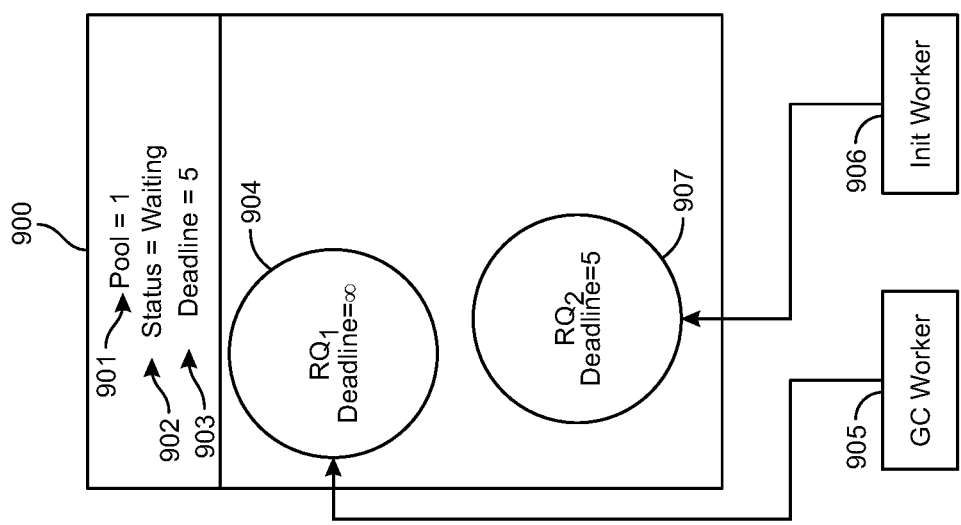

Execution window 900 of FIG. 9A, for example, includes an identifier 901 indicating that it is in a "pool" or wheel of execution windows. The current status 902 of the execution window 900 is idle, and the deadline 903 is 10 seconds. The execution window 900 starts in the idle state. In some cases, the execution window 900 has an upper bound of size. The size upper bound is due to the correlation between items queried and query latency. The coalescing service matches a query with an execution window. In the ENI example above, only certain ENIs may be described together and, as such, only the ENIs that can be described together are put into the same execution window.

In the example of FIG. 9B, the first query that comes in from an agent (e.g., GC Worker 905) states an effective deadline of infinity, as indicated at 904. Such a query thus may not have a time-based trigger or time-based deadline. However, the execution window 900 itself has a deadline of 10 seconds. The VPC service moves status 902 to "waiting," indicating that the request 904 is waiting for the execution window's deadline to expire. In some cases, the execution window's deadline is an absolute time that is based on the origination time of the query, plus the shortest deadline. For example, a query with a deadline of 10 s originated at t+5 s, would generate a more recent trigger than a query with a deadline of 5 s generated at t+8 s. More queries can enter this window if they match the criteria to coalesce. These queries subsequently trigger the execution window 900 to execute. For instance, in FIG. 9C, Init Worker 906 sends a query 907 with a deadline of 5 seconds. As such, the VPC changes the deadline for that execution window to five seconds instead of the previous ten. As such, the VPC will execute the execution window in five seconds unless another query comes in with an earlier deadline or other trigger.

Figure 9E:
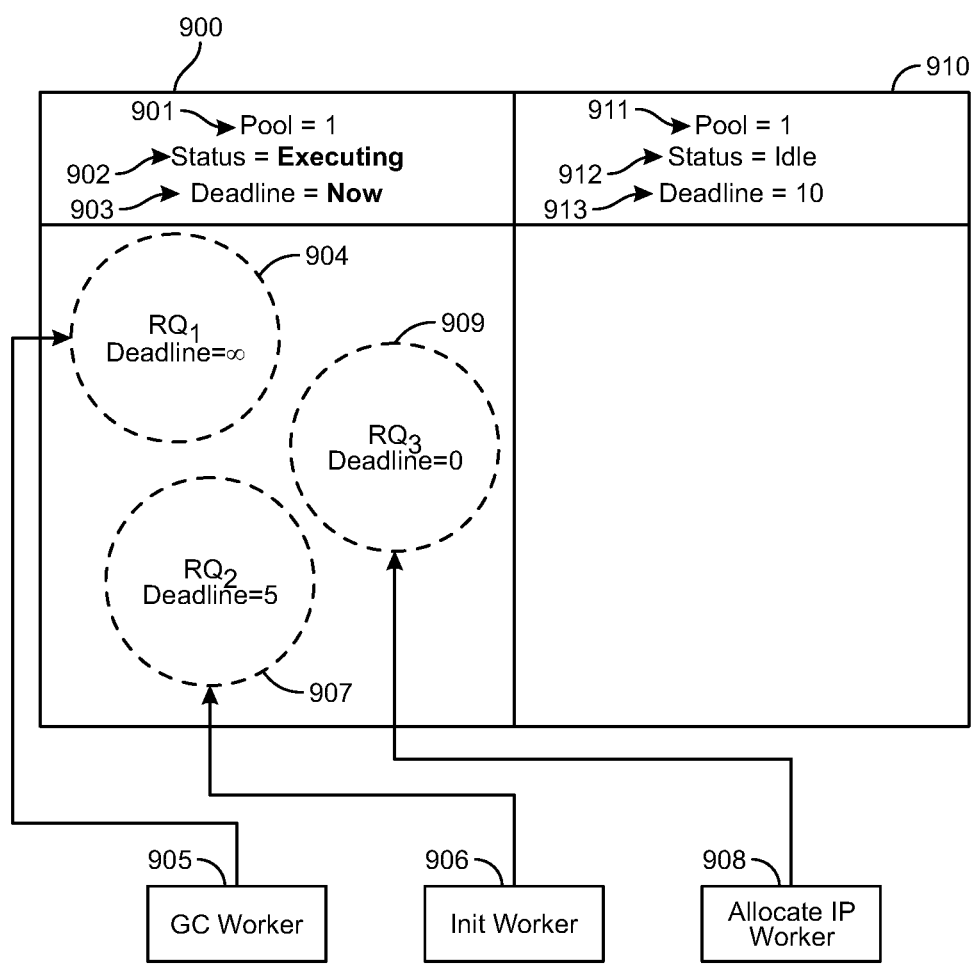
Figure 9G:
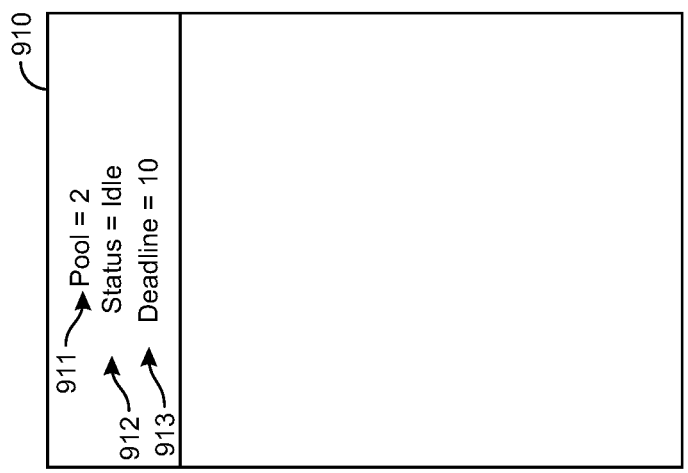
Figure 9F:
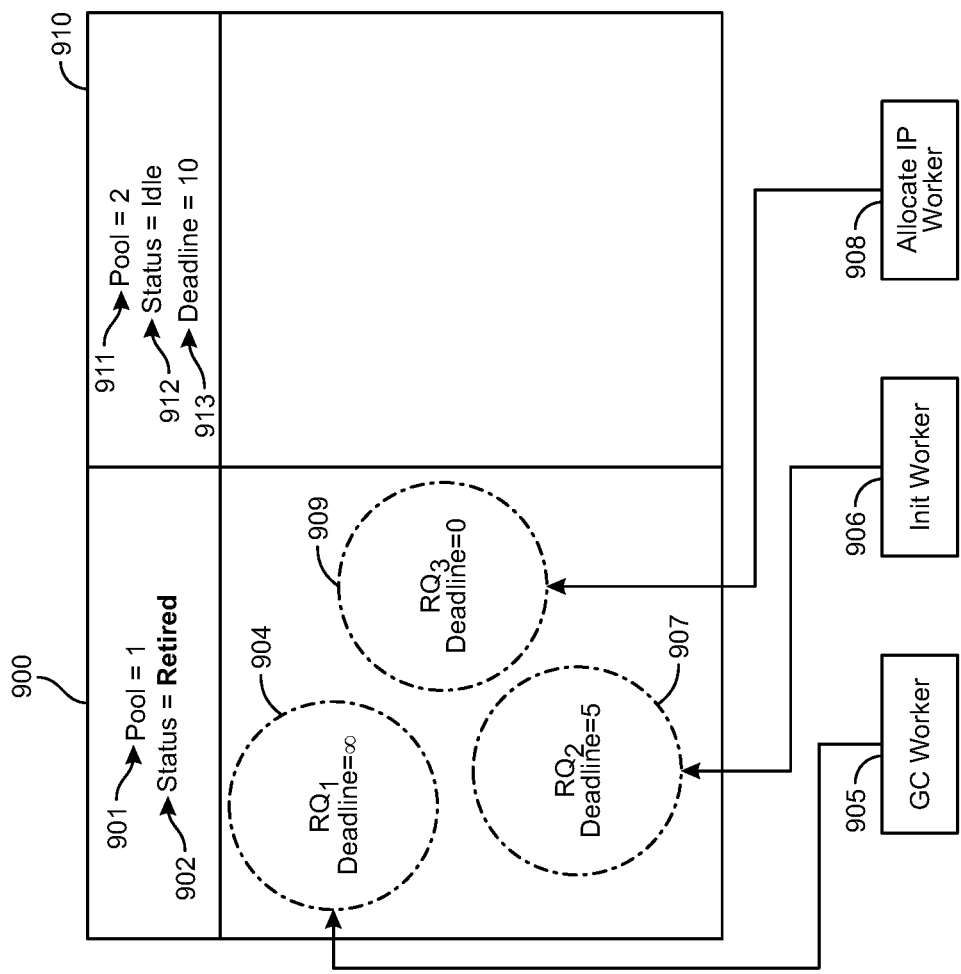

Once a query comes in with a deadline that triggers the window (e.g., request 909 from IP worker 908 in FIG. 9D), the VPC moves the execution window 900 to the executing state, and thus begins querying the backend server with the queries currently in the execution window 900 (e.g., the collection of ENIs from the workers 905, 906, and 908). In some cases, the ENIs in the execution window 900 are also deduped, so if two workers requested to configure the same ENI, the configuration data will not be requested twice, but only once. After the previous execution window moves into the executing state, as shown in FIG. 9E, the VPC will create a new execution window 910 in the same pool of execution windows (911) in the idle state (912) with a deadline 913 of 10 seconds. Once the previous query finishes, the execution window 900 enters the retired state (as shown in FIG. 9F), waiting for the workers 905, 906, and 908 to retrieve their query results. Once the workers have retrieved the data fulfilled by the backend server, the old execution window is removed (as shown in FIG. 9G).

In some cases, if an error occurs during the scheduling process, the VPC service 802 or the computer system 101 of FIG. 1 may be configured to detect the occurrence of these errors and perform remediation steps to remediate the detected errors. These remediation steps include resubmitting the queries in a subsequent execution window or splitting up the queries in the first execution window for subsequent resubmission. For instance, if one of the ENIs is unable to be queried, the other queries in the execution window (e.g., 900) may also fail. In some cases, when such failures occur, the VPC service 802 sends the queries to the backend server one ENI at a time to ensure the queries are properly processed to completion.

In some examples, the above-described method is encoded as computer-readable instructions on a computer-readable medium. In one example, a computer-readable medium includes one or more computer-executable instructions that, when executed by at least one processor of a computing device, cause the computing device to instantiate, within the coalescing service, multiple execution windows to which the received queries are to be assigned, where each execution window has an assigned deadline within which to execute. The instructions then analyze at least a first query among the received queries to identify various characteristics of the first query and assign the first query to a first execution window among the various execution windows according to the identified characteristics. The instructions also, upon detecting the occurrence of a specified trigger for at least one of the queries in the first execution window, execute those queries, including the first query, that are assigned to the first execution window.

In addition, a corresponding system may include at least one physical processor and physical memory comprising computer-executable instructions that, when executed by the physical processor, cause the physical processor to establish a coalescing service configured to combine queries received at the coalescing service. The processor further instantiates, within the coalescing service, multiple execution windows to which the received queries are to be assigned, where each execution window has an assigned deadline within which to execute. The processor then analyzes at least a first query among the received queries to identify various characteristics of the first query and assigns the first query to a first execution window among the various execution windows according to the identified characteristics. The processor also, upon detecting the occurrence of a specified trigger for at least one of the queries in the first execution window, executes those queries, including the first query, that are assigned to the first execution window.

Accordingly, in this manner, methods and systems are provided for coalescing backend server queries before those queries are sent to the backend system. A coalescing service may be implemented to gather the queries into execution windows that each have their own deadlines and potentially their own triggers. The queries themselves may also have triggers and, as such, when any one of the triggers or deadlines has been met, the queries in the full execution window are executed for fulfillment by the backend server. In some cases, the coalescing service uses knowledge about the backend server(s) to smartly organize the queries into execution windows that take advantage of this backend server knowledge, leading to quicker data retrieval times and lower overall latency in the system.

1. A computer-implemented method comprising: establishing a coalescing service configured to combine queries received at the coalescing service; instantiating, within the coalescing service, a plurality of execution windows to which the received queries are to be assigned, each execution window having an assigned deadline within which to execute; analyzing at least a first query among the received queries to identify one or more characteristics of the first query; assigning the first query to a first execution window among the plurality of execution windows according to the identified characteristics; and upon detecting the occurrence of a specified trigger for at least one of the queries in the first execution window, executing those queries, including the first query, that are assigned to the first execution window.

2. The computer-implemented method of claim 1, wherein each of the queries that were assigned to the first execution window before the occurrence of the trigger are executed during execution of the first execution window.

3. The computer-implemented method of claim 1, wherein the specified trigger comprises reaching the deadline assigned to the first execution window.

4. The computer-implemented method of claim 3, wherein the deadline assigned to the first execution window is established as a default trigger if other triggers for other queries are not detected.

5. The computer-implemented method of claim 1, wherein each execution window has a current state that is changeable by the coalescing service based on detecting the occurrence of the specified trigger.

6. The computer-implemented method of claim 1, wherein each execution window has an identifier that uniquely identifies the execution window within the established coalescing service.

7. The computer-implemented method of claim 1, wherein the deadline assigned to each execution window is variable and is determined by the established coalescing service.

8. The computer-implemented method of claim 1, wherein the identified characteristics of the first query comprise at least one of: type of query, type of information being queried, criticality of query, type of database being queried, size of query, or latency tolerance.

9. The computer-implemented method of claim 1, wherein the received queries are assigned to execution windows based on one or more portions of knowledge about a backend system to which the queries are sent upon execution of the execution window.

10. The computer-implemented method of claim 9, wherein the one or more portions of knowledge about the backend system are inferred based on one or more interactions with the backend system.

11. The computer-implemented method of claim 9, wherein the one or more portions of knowledge about the backend system comprise at least one of: backend latency requirements, backend partitions, maximum number of queries per token bucket, or location of backend servers.

12. The computer-implemented method of claim 11, wherein queries satisfied by data stored on a specified backend partition are assigned to the same execution window.

13. A system comprising: at least one physical processor, and physical memory comprising computer-executable instructions that, when executed by the physical processor, cause the physical processor to: establish a coalescing service configured to combine queries received at the coalescing service; instantiate, within the coalescing service, a plurality of execution windows to which the received queries are to be assigned, each execution window having an assigned deadline within which to execute; analyze at least a first query among the received queries to identify one or more characteristics of the first query; assign the first query to a first execution window among the plurality of execution windows according to the identified characteristics; and upon detecting the occurrence of a specified trigger for at least one of the queries in the first execution window, execute those queries, including the first query, that are assigned to the first execution window.

14. The system of claim 13, wherein the queries are received from a plurality of different agents, each agent being configured to execute a specified workload.

15. The system of claim 14, wherein at least a portion of the received queries are received as elastic network interfaces (ENIs) are updated for one or more of the agents.

16. The system of claim 15, wherein the ENIs for the agents are updated automatically upon the occurrence of a specified trigger.

17. The system of claim 13, further comprising detecting the occurrence of one or more errors upon executing the queries assigned to the first execution window.

18. The system of claim 17, further comprising performing one or more remediation steps to remediate the detected errors.

19. The system of claim 18, wherein the one or more remediation steps comprise at least one of resubmitting the queries in the first execution window or splitting up the queries in the first execution window for subsequent resubmission.

20. A non-transitory computer-readable medium comprising one or more computer-executable instructions that, when executed by at least one processor of a computing device, cause the computing device to: establish a coalescing service configured to combine queries received at the coalescing service; instantiate, within the coalescing service, a plurality of execution windows to which the received queries are to be assigned, each execution window having an assigned deadline within which to execute; analyze at least a first query among the received queries to identify one or more characteristics of the first query; assign the first query to a first execution window among the plurality of execution windows according to the identified characteristics; and upon detecting the occurrence of a specified trigger for at least one of the queries in the first execution window, execute those queries, including the first query, that are assigned to the first execution window.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to coalesce transactions, use the result of the transformation to assign queries to an execution window, and store the result of the transformation to execute the execution window. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    instantiating, within a coalescing service, a plurality of execution windows to which received queries are assigned, each execution window having an assigned deadline by which to execute and associated with a subset of inferred backend server knowledge;
    analyzing at least a first query among the received queries to identify one or more characteristics of the first query and a query execution trigger;
    assigning the first query to a first execution window among the plurality of execution windows according to a correspondence between the identified characteristics and the subset of the inferred backend server knowledge associated with the first execution window; and
    upon detecting an occurrence of the query execution trigger of the first query prior to the deadline assigned to the first execution window, executing all queries, including the first query, that are assigned to the first execution window.

2. The computer-implemented method of claim 1, further comprising, prior to instantiating the plurality of execution windows:
    identifying, by the coalescing service, performance data associated with one or more backend servers over a plurality of interactions with the one or more backend servers; and
    inferring backend server knowledge based on the identified performance data.

3. The computer-implemented method of claim 1, wherein the deadline assigned to the first execution window comprises at least one of:
    reaching a deadline timestamp assigned to the first execution window;
    reaching a specified number of queries assigned to the first execution window; or
    receiving a specified type of query.

4. The computer-implemented method of claim 3, wherein the deadline assigned to the first execution window is established as a default trigger if other triggers for other queries are not detected.

5. The computer-implemented method of claim 1, wherein each execution window has a current state that is changeable by the coalescing service based on detecting the occurrence of a query execution trigger or an assigned deadline.

6. The computer-implemented method of claim 1, wherein each execution window has an identifier that uniquely identifies the execution window within the coalescing service.

7. The computer-implemented method of claim 1, wherein the deadline assigned to each execution window is variable and is determined by the coalescing service.

8. The computer-implemented method of claim 1, wherein the identified characteristics of the first query comprise at least one of: type of query, type of information being queried, criticality of query, type of database being queried, size of query, or latency tolerance.

9. The computer-implemented method of claim 2, wherein inferring backend server knowledge is based on identified performance data comprising data access times, data transfer speeds, server names, internet protocol (IP) or media access control (MAC) addresses, server locations, or packet header information.

10. The computer-implemented method of claim 1, wherein the first query is further assigned to the first execution window according to a correspondence between the identified characteristics and backend system knowledge explicitly provided to the coalescing service by the backend server.

11. The computer-implemented method of claim 9, wherein the inferred backend server knowledge comprises at least one of: backend latency requirements, backend partitions, maximum number of queries per token bucket, or location of backend servers.

12. The computer-implemented method of claim 11, wherein queries satisfied by data stored on a specified backend partition are assigned to a common execution window.

13. A system comprising:

at least one physical processor; and physical memory comprising computer-executable instructions that, when executed by the physical processor, cause the physical processor to:

instantiate, within a coalescing service, a plurality of execution windows to which received queries are assigned, each execution window having an assigned deadline by which to execute and associated with a subset of inferred backend server knowledge;

analyze at least a first query among the received queries to identify one or more characteristics of the first query and a query execution trigger;

assign the first query to a first execution window among the plurality of execution windows according to a correspondence between the identified characteristics and the subset of the inferred backend server knowledge associated with the first execution window; and upon detecting an occurrence of the query execution trigger of the first query prior to the deadline assigned to the first execution window, execute all queries, including the first query, that are assigned to the first execution window.

14. The system of claim 13, wherein the queries are received from a plurality of different agents, each agent being configured to execute a specified workload.

15. The system of claim 14, wherein at least a portion of the received queries are received as elastic network interfaces (ENIs) are updated for one or more of the agents.

16. The system of claim 15, wherein the ENIs for the agents are updated automatically upon the occurrence of the query execution trigger.

17. The system of claim 13, further comprising detecting the occurrence of one or more errors upon executing all of the queries assigned to the first execution window.

18. The system of claim 17, further comprising performing one or more remediation steps to remediate the detected errors.

19. The system of claim 18, wherein the one or more remediation steps comprise at least one of resubmitting the queries in the first execution window or splitting up the queries in the first execution window for subsequent resubmission.

20. A non-transitory computer-readable medium comprising one or more computer-executable instructions that, when executed by at least one processor of a computing device, cause the computing device to:

instantiate, within a coalescing service, a plurality of execution windows to which received queries are assigned, each execution window having an assigned deadline by which to execute and associated with a subset of inferred backend server knowledge;

analyze at least a first query among the received queries to identify one or more characteristics of the first query and a query execution trigger;

assign the first query to a first execution window among the plurality of execution windows according to a correspondence between the identified characteristics and the subset of the inferred backend server knowledge associated with the first execution window; and upon detecting an occurrence of the query execution trigger of the first query prior to the deadline assigned to the first execution window, execute all queries assigned to the first execution window including the first query.

* * * * *